United States Patent
Chiu et al.

(10) Patent No.: US 11,106,278 B2
(45) Date of Patent: Aug. 31, 2021

(54) OPERATION METHOD FOR MULTI-MONITOR AND ELECTRONIC SYSTEM USING THE SAME

(71) Applicant: Acer Incorporated, New Taipei (TW)

(72) Inventors: Sheng-Lin Chiu, New Taipei (TW); Chao-Kuang Yang, New Taipei (TW); An-Cheng Lee, New Taipei (TW); Ying-Shih Hung, New Taipei (TW); Cheng-Tse Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/409,866

(22) Filed: May 12, 2019

(65) Prior Publication Data

US 2020/0133389 A1   Apr. 30, 2020

(30) Foreign Application Priority Data

Oct. 31, 2018 (TW) .................. 107138544

(51) Int. Cl.
*G09G 5/00* (2006.01)
*G06F 3/01* (2006.01)
*G06T 7/73* (2017.01)

(52) U.S. Cl.
CPC ............ *G06F 3/013* (2013.01); *G06T 7/73* (2017.01); *G06T 2207/20081* (2013.01); *G06T 2207/30201* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 2010/0220975 A1* | 9/2010 | Kondo | G11B 27/005 386/350 |
| 2012/0272179 A1* | 10/2012 | Stafford | G06F 3/012 715/781 |
| 2012/0326945 A1* | 12/2012 | Ellis | G06F 3/1423 345/1.1 |
| 2017/0097677 A1 | 4/2017 | McLean | |
| 2018/0366089 A1* | 12/2018 | Sekiguchi | G06F 3/1423 |

FOREIGN PATENT DOCUMENTS

| | | |
|---|---|---|
| CN | 1700242 | 11/2005 |
| CN | 103518172 | 1/2014 |
| CN | 106469038 | 3/2017 |

* cited by examiner

*Primary Examiner* — Nan-Ying Yang
(74) *Attorney, Agent, or Firm* — JCIPRNET

(57) ABSTRACT

The invention provides an operation method for multi-monitor applicable to an electronic system including a plurality of monitors. The operation method for multi-monitor includes capturing a current image including a user by using a camera, calculating a current gaze direction of the user according to the current image, and determining a target monitor according to the current gaze direction of the user. After the target monitor is determined, the operation method for multi-monitor further includes moving an object to a display area of the target monitor. In addition to the operation method for multi-monitor, an electronic system using the operation method is also provided.

10 Claims, 6 Drawing Sheets

OPERATION METHOD FOR MULTI-MONITOR AND ELECTRONIC SYSTEM USING THE SAME

CROSS-REFERENCE TO RELATED APPLICATION

This application claims the priority benefit of Taiwan application serial no. 107138544, filed on Oct. 31, 2018. The entirety of the above-mentioned patent application is hereby incorporated by reference herein and made a part of this specification.

BACKGROUND OF THE INVENTION

1. Field of the Invention

The invention relates to an operation for multi-monitor and an electronic system using the same.

2. Description of Related Art

When using a computer, although multiple monitors can increase the workspace to achieve a multitasking environment, in order to switch focus to a different monitor, users still have to manually move a mouse cursor or a program window between the monitors. However, the increased screen size and resolution nowadays would cause many troubles when users operate between the monitors. For instance, with the increased screen size, it is quite difficult to find the relatively small mouse cursor on the monitors. Also, when dragging the window to move between the monitors, the mouse needs to move quite a long distance.

SUMMARY OF THE INVENTION

Accordingly, the embodiments of the invention provide an operation method for multi-monitor and an electronic system using the method, which can ensure a good user experience since the user can have an object moved to a display area of a target monitor simply by looking at the target monitor.

The operating method for multi-monitor proposed in an embodiment of the invention is applicable to an electronic system including a plurality of monitors and a camera. The operation method for multi-monitor includes the following steps of: acquiring calibration data of the monitors, wherein the calibration data includes a gaze range of each monitor watched; calculating a current gaze direction according to a current image captured by the camera; selecting a target monitor among the monitors according to the calibration data and the current gaze direction, wherein the gaze range of the target monitor watched includes the current gaze direction; and moving an object to a display area of the target monitor.

The electronic system proposed in an embodiment of the invention includes a plurality of monitors, a storage device, a camera and a processor. The storage device is configured to record calibration data of the monitors, wherein the calibration data includes a gaze range of each monitor watched. The camera is configured to capture a current image. The processor is coupled to the monitors, the storage device and the camera, and configured to: calculate a current gaze direction according to the current image; select a target monitor among the monitors according to the calibration data and the current gaze direction, wherein the gaze range of the target monitor watched includes the current gaze direction; and move an object to a display area of the target monitor.

The operating method for multi-monitor proposed in another embodiment of the invention is applicable to an electronic system including a plurality of monitors and a plurality of cameras, wherein each of the monitors corresponds to one of the cameras. The operation method for multi-monitor includes the following steps of: capturing a plurality of current images by using the cameras, respectively; calculating a plurality of included angles between a current gaze direction and a lens direction of the cameras according to the current images; selecting a target monitor among the monitors according to the included angles, wherein an included angle between the lens direction of the camera corresponding to the target monitor and the current gaze direction is a smallest included angle among the included angles; and moving an object to a display area of the target monitor.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
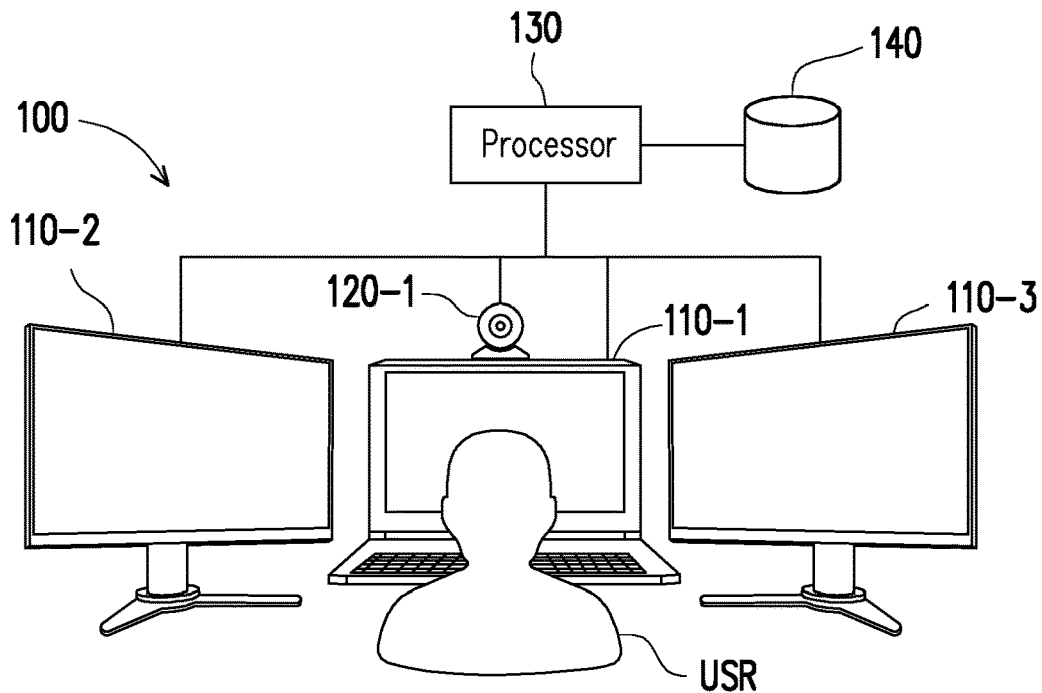
FIG. 1 illustrates a schematic diagram of an electronic system in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of an electronic system in an embodiment of the invention.

With reference to FIG. 1, an electronic system 100 in an embodiment of the invention includes a plurality of monitors 110-1, 110-2 and 110-3, a camera 120-1, a processor 130 and a storage device 140. Here, the monitors 110-1, 110-2 and 110-3, the camera 120-1 and the storage device 140 are all coupled to the processor 130. In this embodiment, the camera 120-1 captures an image of a user USR so the processor 130 can calculate a gaze direction of the user USR according to the image of the user USR captured by the camera 120-1 to thereby determine a target monitor for the user USR to operate and eventually move an object (e.g., a cursor, a file, a folder or a window) operated by the user USR to the target monitor. It should be noted that, although the present embodiment is described using three monitors 110-1, 110-2 and 110-3 as an example, the number of the monitors is not particularly limited in the invention. In other embodiments, the electronic system 100 may also include two monitors, four monitors or more monitors.

Figure 2:
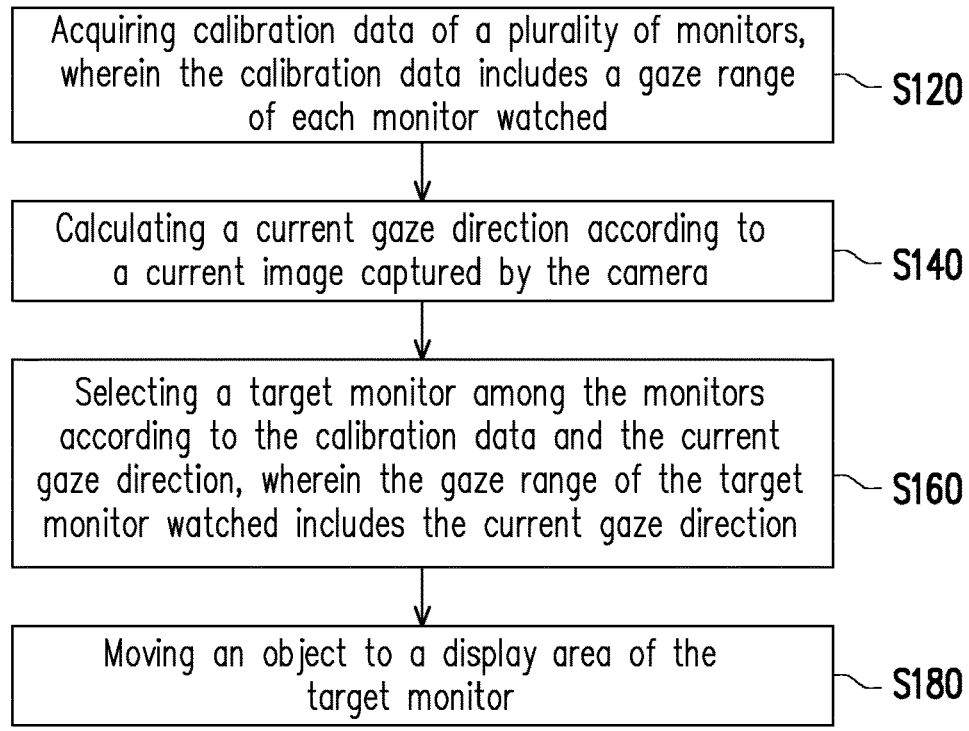
FIG. 2 illustrates a flowchart of an operation method for multi-monitor in an embodiment of the invention.

FIG. 2 illustrates a flowchart of an operation method for multi-monitor in an embodiment of the invention.

With reference to FIG. 2, first of all, the processor 130 of the electronic system 100 acquires calibration data of the monitors 110-1, 110-2 and 110-3 (step S120). Specifically, the calibration data is configured to record a gaze range of the user USR when watching each of the monitors 110-1, 110-2 and 110-3. Details regarding how to acquire the calibration data of the monitors 110-1, 110-2 and 110-3 will be described with reference to an embodiment as follows.

Figure 3:
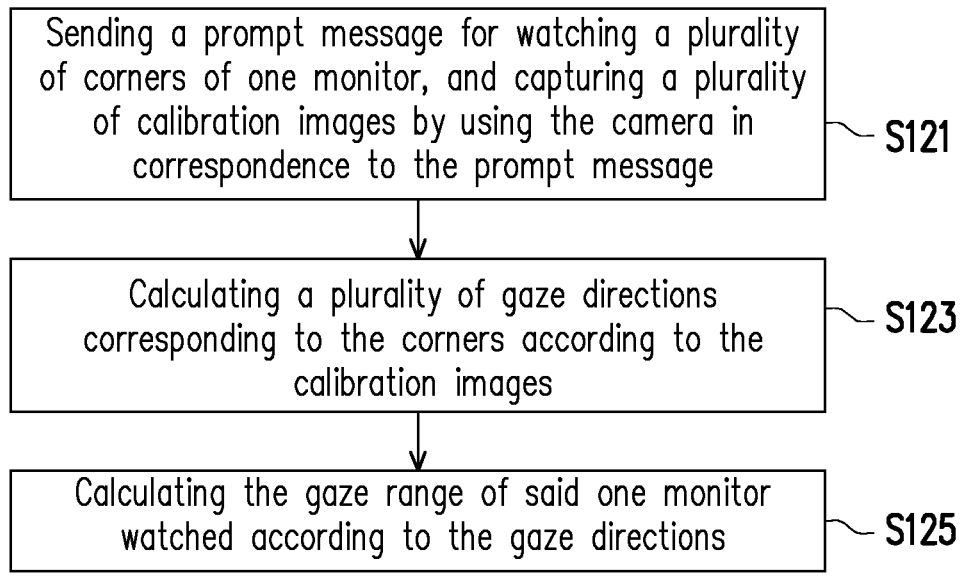
FIG. 3 illustrates a flowchart for acquiring calibration data of multiple monitors in an embodiment of the invention.

FIG. 3 illustrates a flowchart for acquiring calibration data of multiple monitors in an embodiment of the invention. With reference to FIG. 3, when the calibration data is to be acquired, the processor 130 sends a prompt message for watching a plurality of corners of one of the monitors, and captures a plurality of calibration images by using the camera 120-1 in correspondence to the prompt message (step S121). In this embodiment, the prompt message prompts the user USR to watch corners at four vertices of each of the rectangular monitors 110-1, 110-2 and 110-3 so the camera 120-1 can capture the image of the user USR as the calibration image for each corner of each monitor watched.

Figure 4:
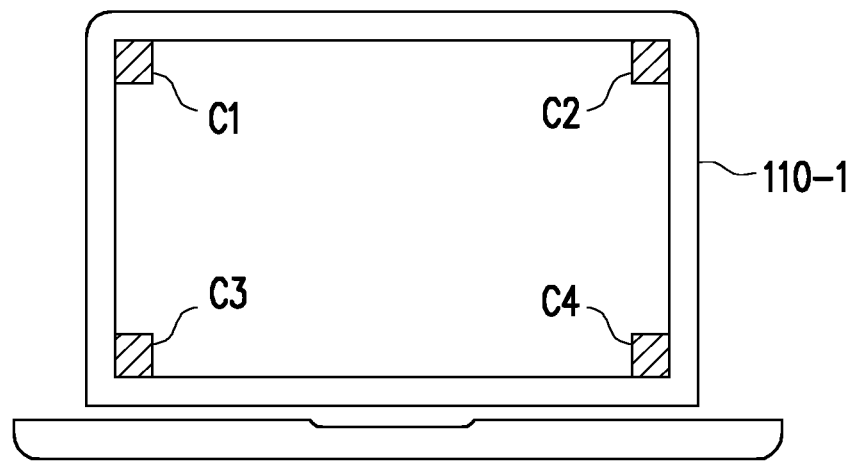
FIG. 4 illustrates a schematic diagram of a prompt message in an embodiment of the invention.

FIG. 4 illustrates a schematic diagram of a prompt message in an embodiment of the invention. With reference to FIG. 1 in which the monitor 110-1 is taken as an example, the processor 130 displays, for example, a prompting mark at one corner C1 on a display area of the monitor 110-1, and then uses the camera 120-1 to correspondingly capture the image of the user USR watching the corner C1 of the monitor 110-1 as one calibration image; displays the prompting mark at one corner C2 on the display area of the monitor 110-1, and then uses the camera 120-1 to correspondingly capture the image of the user USR watching the corner C2 of the monitor 110-1 as one calibration image; displays the prompting mark at one corner C3 on the display area of the monitor 110-1, and then uses the camera 120-1 to correspondingly capture the image of the user USR watching the corner C3 of the monitor 110-1 as one calibration image; displays the prompting mark at one corner C4 on the display area of the monitor 110-1, and then uses the camera 120-1 to correspondingly capture the image of the user USR watching the corner C4 of the monitor 110-1 as one calibration image. Nonetheless, the prompting mark may be presented in any manner, and the invention is not limited thereto.

Referring back to FIG. 3, the processor 130 calculates a plurality of gaze directions corresponding to the corers according to the calibration images (step S123). Specifically, each calibration image corresponding to one of the monitors is the image of the user USR watching one of the corners of that monitor. The processor 130 then performs an image analysis for the calibration images to calculate the gaze direction of the user USR watching said monitor for each corner.

Subsequently, the processor 130 may calculate a gaze range of that monitor watched according to the gaze directions (step S125). Specifically, all the vertices on a surface of a polygon can define an area of the surface, and the gaze range of one monitor watched may be defined by the gaze directions by which the corners of the monitor are watched.

Figure 5A:
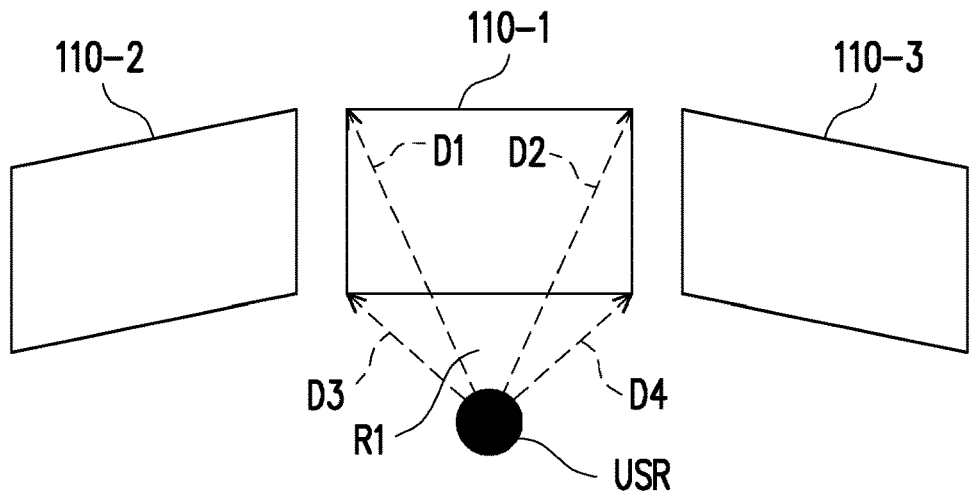
FIG. 5A to FIG. 5C are schematic diagrams illustrating gaze ranges in an embodiment of the invention.
Figure 5B:
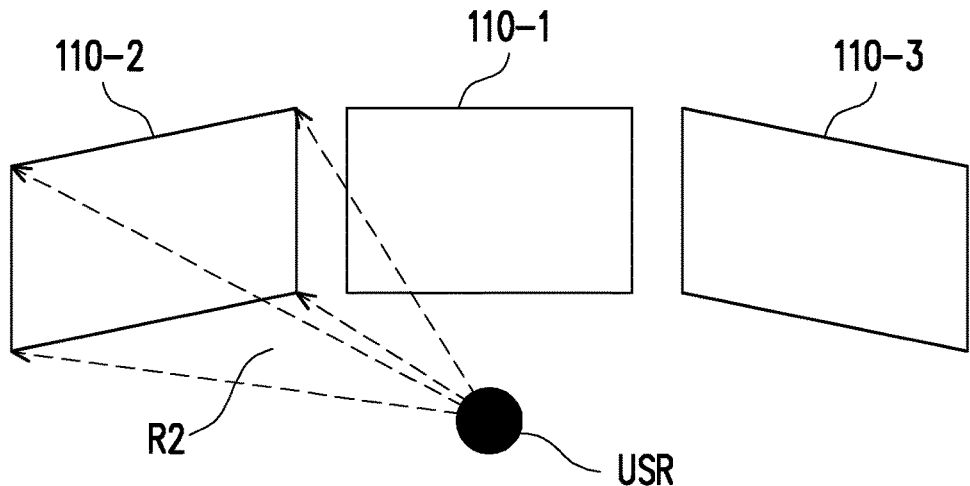
Figure 5C:
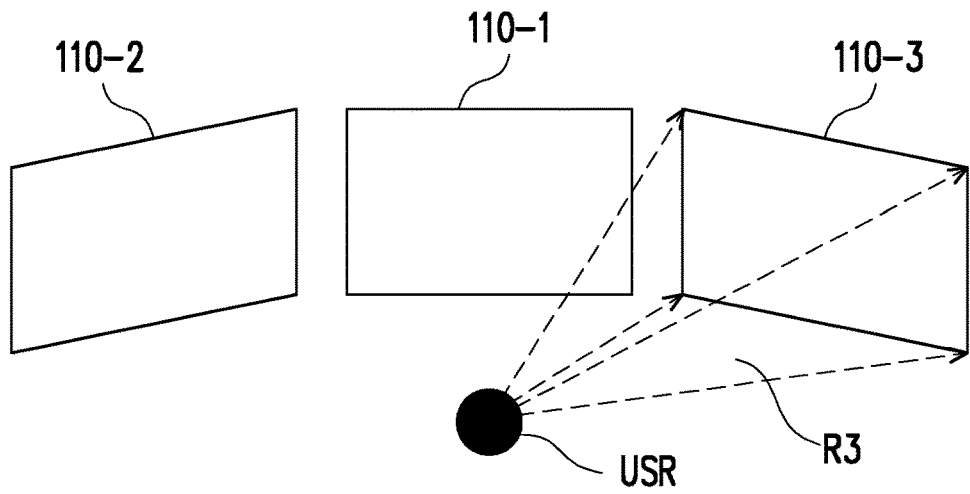

FIG. 5A to FIG. 5C are schematic diagrams illustrating gaze ranges in an embodiment of the invention. With reference to FIG. 5A, in correspondence to the monitor 110-1, the processor 130 performs the image analysis for the calibration image of corner C1 to calculate a gaze direction D1 in which the corner C1 is watched; performs the image analysis for the calibration image of corner C2 to calculate a gaze direction D2 in which the corner C2 is watched; performs the image analysis for the calibration image of corner C3 to calculate a gaze direction D3 in which the corner C3 is watched; performs the image analysis for the calibration image of corner C4 to calculate a gaze direction D4 in which the corner C4 is watched. In this way, according to the gaze directions D1, D2, D3 and D4, the processor 130 can calculate that a gaze range R1 of the monitor 110-1 watched is a quadrangular pyramid surrounded and formed by the gaze directions D1, D2, D3 and D4. In other words, it means that the user USR is watching the monitor 110-1 as long as the gaze direction of the user USR falls in the quadrangular pyramid surrounded and formed by the gaze directions D1, D2, D3 and D4 (i.e., the gaze direction of the user USR falls in the gaze range R1).

With reference to FIG. 5B and FIG. 5C, by using the method of calculating the gaze range R1 of the monitor 110-1 watched, a gaze range R2 of the monitor 110-2 watched and a gaze range R3 of the monitor 110-3 watched may both be calculated. In certain embodiments, the gaze ranges R1, R2 and R3 of the monitors 110-1, 110-2 and 110-3 do not overlap one another. Nevertheless, in certain embodiments, due to different sizes or different set locations of the monitors 110-1, 110-2 and 110-3, the gaze ranges R1, R2 and R3 may also have overlapping areas. When the gaze ranges R1, R2 and R3 have overlapping areas, the processor 130 may, for example, give a priority level to each of the gaze ranges R1, R2 and R3 to indicate an applicable priority for each of the gaze ranges R1, R2 and R3.

In this embodiment, when calculating the gaze directions of the user USR in the image, the processor 130 calculates a head turning angle of the user USR by using a machine learning model (e.g., OpenFace) and the represents the gaze direction of the user USR with the head turning angle. For instance, after the image is input into the machine learning model, the machine learning model identifies a plurality of feature points on a head image of the user USR in the image, and fits the feature points onto a 3D head model.

Figure 6:
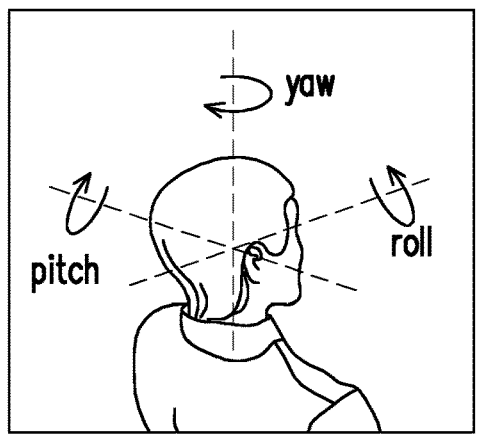
FIG. 6 illustrates a schematic diagram of a head turning angle in an embodiment of the invention.

FIG. 6 illustrates a schematic diagram of a head turning angle in an embodiment of the invention. As shown by FIG. 6, after the feature points are fitted onto the 3D head model, the processor 130 can learn of the yaw angle, the roll angle and the pitch angle of the head of the user USR in the image. In this embodiment, the head turning angle is expressed only by the yaw angle and the pitch angle to speed up calculation and save memory space.

It is worth noting that, the invention does not limit the specific way in which the processor 130 analyzes the image to calculate the gaze direction of the user USR, which may be decided by persons with ordinary skill in the art according to a computing power of the processor 130 or other requirements.

In this embodiment, the processor 130 records the calculated gaze ranges R1, R2 and R3 of the monitors 110-1, 110-2 and 110-3 watched in the storage device 140.

Referring back to FIG. 2, during the actual use of the electronic system 100 by the user USR, the camera 120-1 will capture an image of the user USR. The processor 130 calculates a current gaze direction according a current image captured by the camera 120-1 (step S140). Specifically, the current image is an image of the user USR currently captured by the camera 120-1, in which the head image of the user USR is included. In this embodiment, as described in the foregoing paragraphs, the processor 130 inputs, for example, the current image including the head image into the machine learning model so the machine learning model can identify the feature points of the head image to thereby calculate the head turning angle of the user USR. The processor 130 uses the head turning angle as the current gaze direction of the user USR.

In certain embodiments, the current image may include more than one head image, and the processor 130 may select one of the head images as the reference for subsequent determination based on a multi-user determination mechanism. For instance, when multiple users are in front of the camera 120-1 at the same time, the camera 120-1 may capture the current image including more than one head image. In this case, the processor 130 needs to select one of the users as a main user, and uses the head turning angle of the main user to be the current gaze direction for subsequent determination.

Figure 7A:
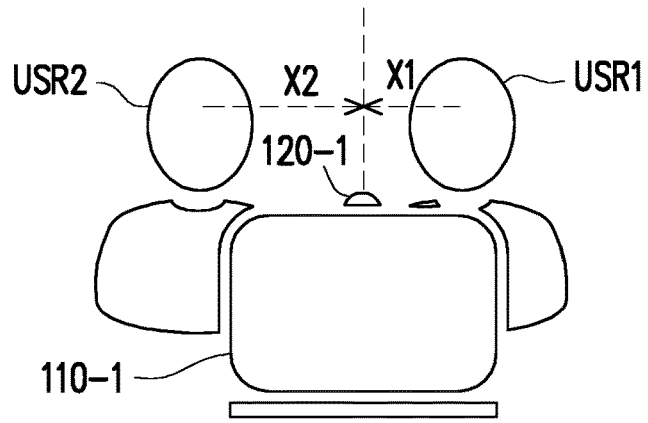
FIG. 7A and FIG. 7B are schematic diagram illustrating a multi-user determination mechanism in an embodiment of the invention.
Figure 7B:
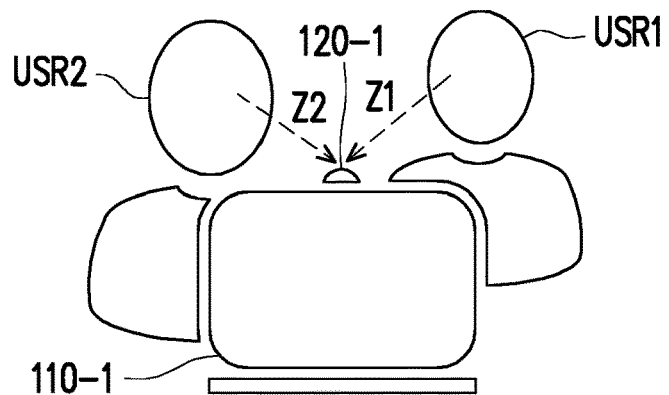

FIG. 7A and FIG. 7B are schematic diagram illustrating a multi-user determination mechanism in an embodiment of the invention.

In certain embodiments, the multi-user determination mechanism selects the user with the head image closer to a perpendicular bisector of the current image as the main user to determine the current gaze direction. With reference to FIG. 7A, the current image captured by the camera 120-1 includes, for example, a head image of a first user USR1 and a head image of a second user USR2. For example, the processor 130 first defines determination points (e.g., noses) of the head images, and then acquires a distance X1 from the head image to the first user USR1 to the perpendicular bisector of the current image and a distance X2 from the head image to the second user USR2 to the perpendicular bisector of the current image according to the determination points. Since the distance X1 is less than the distance X2, the processor 130 selects the first user USR1 as the main user. In other words, the gaze direction or the head turning angle of the first user USR1 is used as the current gaze direction.

In certain embodiments, outputs of the machine learning model include the distance from each user to the camera 120-1 in the image so the multi-user determination mechanism can select the user with the head image closer to the camera 120-1 as the main user to determine the current gaze direction. With reference to FIG. 7B, the current image captured by the camera 120-1 includes, for example, a head image of a first user USR1 and a head image of a second user USR2. The machine learning model calculates, for example, a distance Z1 between the head image of the first user USR1 and the camera 120-1 and a distance Z2 between the head image of the second user USR2 and the camera 120-1. Since the distance Z2 is less than the distance Z1, the processor 130 selects the second user USR2 as the main user. In other words, the gaze direction or the head turning angle of the second user USR2 is used as the current gaze direction.

In this embodiment, the processor 130 first selects the user with the head image closer to the perpendicular bisector of the current image, and then selects the user with the head image closer to the camera 120-1 as the main user to determine the current gaze direction only when the head images of all the users have the same distance from the perpendicular bisector of the current image.

In certain embodiments, the processor 130 may further select the main user in conjunction with a facial recognition technology. For instance, the user may record facial data of the user's own in a database (e.g., the storage device 140) using a pre-registration method. After acquiring the current image including more than one head image, the processor 130 first selects qualified users by using the facial recognition technology according to the facial data in the database. If there is only one qualified user, that user is used as the main user; If there are more than one qualified user, the main user is determined by using the method introduced in the foregoing paragraphs based on the multi-user determination mechanism.

Referring back to FIG. 2, after calculating the current gaze direction, the processor 130 selects a target monitor among the monitors 110-1, 110-2 and 110-3 according to the calibration data and the current gaze direction, wherein the gaze range of the target monitor watched includes the current gaze direction (step S160). Specifically, the processor 130 determines whether the current gaze direction falls in one of the gaze ranges R1, R2 and R3 of the monitors 110-1, 110-2 and 110-3, and determines the monitor with the gaze range including the current gaze direction as the target monitor. With reference to FIG. 5A, FIG. 5B and FIG. 5C, if the current gaze direction falls in the gaze range R1, the processor 130 selects the monitor 110-1 as the target monitor; if the current gaze direction falls in the gaze range R2, the processor 130 selects the monitor 110-2 as the target monitor; if the current gaze direction falls in the gaze range R3, the processor 130 selects the monitor 110-3 as the target monitor.

Subsequently, the processor 130 moves an object to a display area of the target monitor (step S180). Specifically, when the user USR turns to look at the target monitor from an operating monitor, the processor 130 moves the object into the display area of the target monitor. The moved object may be one of a cursor, a file, a folder and a window or a combination thereof. In certain embodiments, when the user USR turns to look at the target monitor from the operating monitor, the processor 130 moves the cursor to a center position of the display area of the target monitor.

Figure 8:
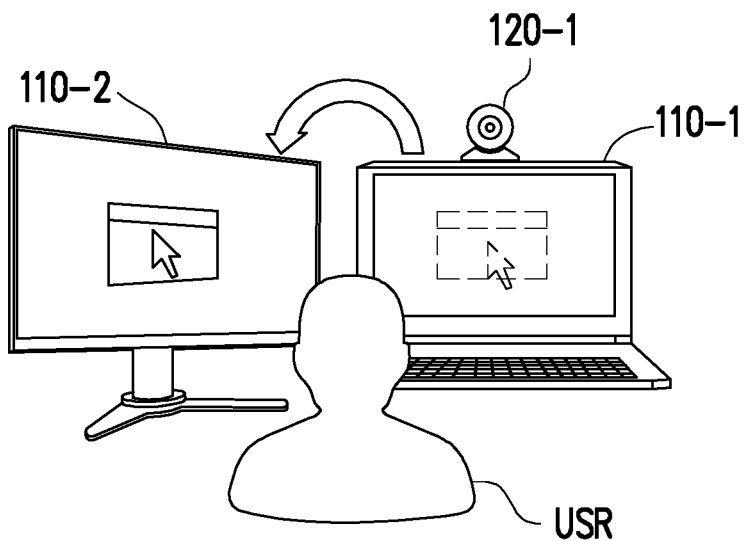
FIG. 8 illustrates a schematic diagram for moving an object to a display area of a target monitor in an embodiment of the invention.

FIG. 8 illustrates a schematic diagram for moving an object to a display area of a target monitor in an embodiment of the invention. With reference to FIG. 8, in certain embodiments, the user USR operates, for example, a cursor and a window in the display area of the monitor 110-1. When the user USR turns to look at the monitor 110-2 from the monitor 110-1, the processor 130 will determine that the target monitor is switched to the monitor 110-2 and automatically move the cursor and the window to the display area of the monitor 110-2, for example.

In certain embodiments, the user USR may, for example, customize the object to be move together with the gaze direction. In certain embodiments, the user USR may set up a moving manner of the object by, for example, a menu, etc. For instance, the user USR may, for example, select the moving manner of the window to be "Move" through the menu. In this case, when the user USR turns to look at the target monitor from the monitor where the window is operated, the processor 130 will release the control after moving the window to the display area of the target monitor. In this way, if the user USR proceeds to look at another monitor, the processor 130 would not continue to correspondingly move the window. As another example, the user USR may, for example, select the moving manner of the window to be "Drag" through the menu. In this case, when the user USR turns to look at the target monitor from the monitor where the window is operated, the processor 130 will maintain the control after moving the window to the display area of the target monitor. In this way, if the user USR proceeds to look at another monitor, the processor 130 will continue to correspondingly move the window into the display area of said another monitor.

Based on the operation method for multi-monitor described above, the user USR can have the cursor, the file, the folder or the window moved to the display area of the target monitor simply by looking at the target screen. In this way, not only can the time for searching the cursor in the monitors 110-1, 110-2 and 110-3 be saved, an overly long moving distance of the mouse caused by manually moving the object may also be prevented.

Figure 9:
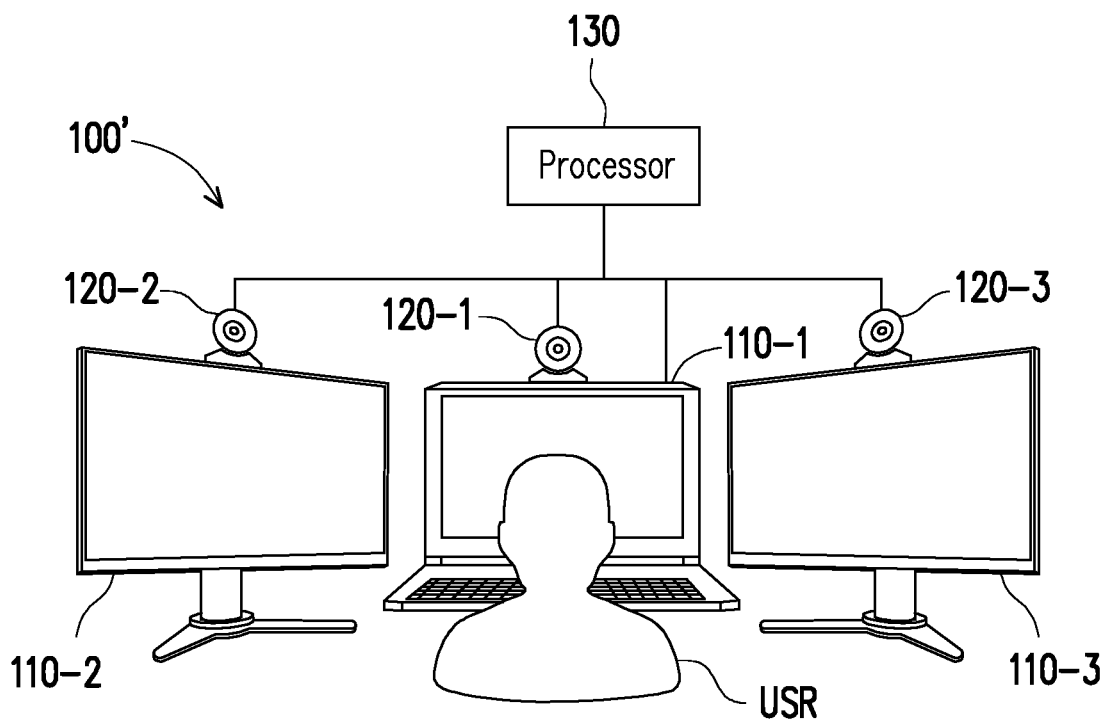
FIG. 9 illustrates a schematic diagram of an electronic system in an embodiment of the invention.

FIG. 9 illustrates a schematic diagram of an electronic system in an embodiment of the invention. This embodiment uses the same reference numerals as those used in the embodiment of FIG. 1 to denote the same or similar elements.

With reference to FIG. 9, an electronic system 100' in another embodiment of the invention includes a plurality of monitors 110-1, 110-2 and 110-3, a plurality of cameras 120-1, 120-2 and 120-3, and a processor 130. Here, the monitors 110-1, 110-2 and 110-3 and the cameras 120-1, 120-2 and 120-3 are all coupled to the processor 130. In this embodiment, the monitors 110-1, 110-2 and 110-3 and the cameras 120-1, 120-2 and 120-3 are correspondingly disposed. For instance, as shown by FIG. 9, the camera 120-1 is disposed at a center of an upper edge of the monitor 110-1; the camera 120-2 is disposed at a center of an upper edge of the monitor 110-2; the camera 120-3 is disposed at a center of an upper edge of the monitor 110-3. It should be noted that, although the present embodiment is described using three monitors 110-1, 110-2 and 110-3 as an example, the number of the monitors is not particularly limited in the invention. In other embodiments, the electronic system 100' may also include two monitors, four monitors or more monitors.

Figure 10:
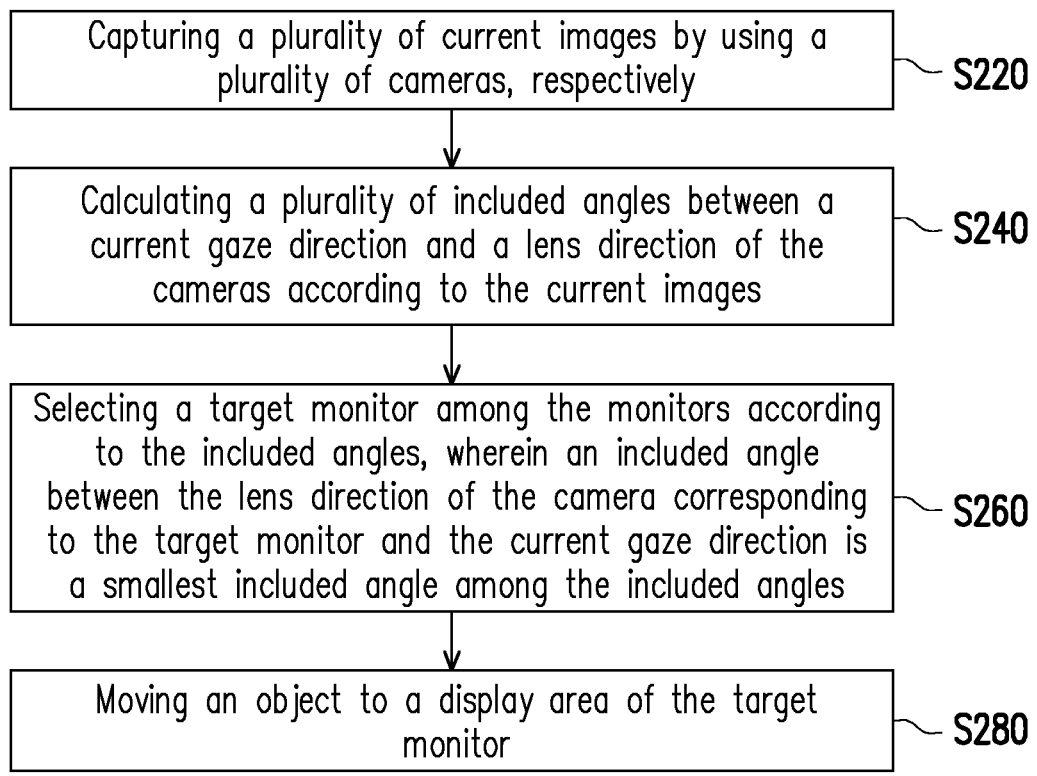
FIG. 10 illustrates a flowchart of an operation method for multi-monitor in an embodiment of the invention.

FIG. 10 illustrates a flowchart of an operation method for multi-monitor in an embodiment of the invention.

With reference to FIG. 10, first of all, the processor 130 of the electronic system 100' captures a plurality of current images by using the cameras 120-1, 120-2 and 120-3, respectively (step S220). Specifically, the camera 120-1 captures a first current image including the head image of the user USR from a first angle; the camera 120-2 captures a second current image including the head image of the user USR from a second angle; the camera 120-3 captures a third current image including the head image of the user USR from a third angle.

After acquiring the current images, the processor 130 calculates a plurality of included angles between a current gaze direction and a lens direction of the cameras 120-1, 120-2 and 120-3 according to the current images (step S240). Specifically, the lens direction of the camera may be learnt from an image plane of the current image. In addition, the processor 130 performs the image analysis for the current image captured by each of the cameras 120-1, 120-2 and 120-3 to calculate the current gaze direction. Accordingly, the included angle between the current gaze direction and the lens direction of each of the cameras 120-1, 120-2 and 120-3 may be acquired. The manner of calculating the current gaze direction has been described in detail in the foregoing embodiments, which are not repeated hereinafter.

Next, the processor 130 selects a target monitor among the monitors 110-1, 110-2 and 110-3 according to the included angles, wherein an included angle between the lens direction of the camera corresponding to the target monitor and the current gaze direction is a smallest included angle among the included angles (step S260). Specifically, the included angle between the lens direction of the camera and the current gaze direction being smaller indicates where the user USR is watching is closer to the camera. In this embodiment, since the cameras 120-1, 120-2 and 120-3 are disposed at the centers of the upper edges of the monitors 110-1, 110-2 and 110-3, respectively, the processor 130 will select the monitor corresponding to the camera with the smallest included angle between the lens direction and the current gaze direction as the current monitor.

Lastly, the processor 130 moves an object to a display area of the target monitor (step S280). Step S280 is similar to step S180 in the foregoing embodiment so the related detail can refer to description for step S180, which is not repeated hereinafter.

In certain embodiments, after one of the monitors 110-1, 110-2 and 110-3 is determined as the target monitor by the processor 130, if the user USR changes the gaze direction, the processor 130 does not need to re-determine the target monitor via steps S220 to S280, but can directly determine the new target monitor according to the current image acquired by the camera corresponding to the current target monitor together with a positional relationship known between the monitors 110-1, 110-2, and 110-3. Related description to the above is exemplified below with FIG. 11.

Figure 11:
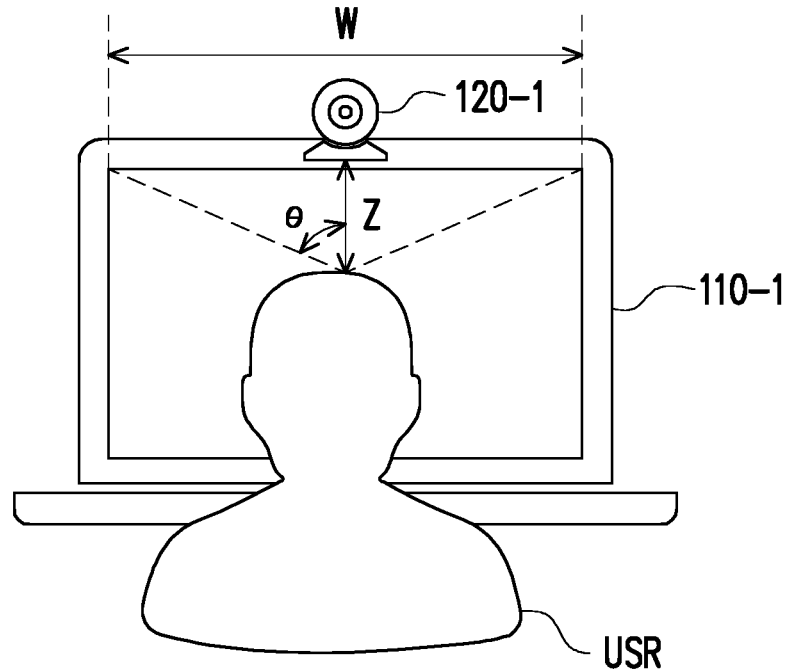
FIG. 11 illustrates a schematic diagram of an operation method for multi-monitor in an embodiment of the invention.

FIG. 11 illustrates a schematic diagram of an operation method for multi-monitor in an embodiment of the invention.

With reference to FIG. 11, the processor 130 has determined that the monitor 110-1 is the target monitor in step S260. Subsequently, the processor 130 continuously analyzes the current image (the first current image) acquired by the camera 120-1 corresponding to the monitor 110-1 to determine whether the included angle between the current gaze direction and the lens direction of the camera 120-1 exceeds an angle threshold θ. In this embodiment, with the lens direction of the camera 120-1 used as the reference, the processor 130 can determine whether the yaw angle in the head turning angle of the user USR is greater than the angle threshold θ. If so, the target monitor needs to be changed to the other monitor. Otherwise, the target monitor is unchanged and remained being the monitor 110-1. Here, the included angle θ is determined according to the following equation:

$$\theta = \tan^{-1}\left(\frac{W}{2Z}\right)$$

Here, W is a width of the monitor 110-1, and Z is a distance between the head image in the current image and the camera 120-1.

In addition, the processor 130 further determines the new target monitor according to a head turning direction of the user USR and the positional relationship between the monitors 110-1, 110-2 and 110-3. A value of the head turning angle of the user USR may represent the head turning direction. For instance, if the processor 130 determines that the user USR turns the head to the right according to the head turning angle and the yaw angle is greater than the included angle threshold θ, the processor 130 then determines that the new target monitor is the monitor 110-3 according to the positional relationship between the monitors 110-1, 110-2 and 110-3 (as shown by FIG. 9). If the processor 130 determines that the user USR turns the head to the left according to the head turning angle and the yaw angle is greater than the included angle threshold θ, the processor 130 then determines that the new target monitor is the monitor 110-2 according to the positional relationship between the monitors 110-1, 110-2 and 110-3 (as shown by FIG. 9).

In other embodiments, other than a horizontal arrangement, the monitors may also be disposed from bottom up as an array. Accordingly, in addition to considering whether the yaw angle is greater than the included angle threshold θ when determining whether to switch the target monitor to the monitor on the left or the right of the current target monitor, the processor 130 also needs to consider the pitch angle, so as to determine whether to switch the target monitor to the monitor on the top or the bottom of the current target monitor.

In this way, after determining the target monitor once, the processor 130 can determine a subsequent switching manner of the target monitor according to the current image acquired by the camera corresponding to the target monitor, so as to speed up calculation and reduce burden on the system.

To sum up, in the operation method for multi-monitor and the electronic system proposed by the embodiments of the invention, the current image including the user is captured by the camera and the current gaze direction is calculated by analyzing the current image so then the target monitor watched by the user can be determined according to the current gaze direction. As a result, the operation method for multi-monitor and the electronic system can move the object to the display area of the target monitor for the user according to the gaze direction of the user so the good user experience may be provided since the convenience in operation may be significantly improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operation method for multi-monitor applicable to an electronic system including a plurality of monitors and a camera, the operation method for multi-monitor comprises:
acquiring calibration data of the monitors, wherein the step of acquiring the calibration data of the monitors comprises:
sending a prompt message to be appeared on one of the monitors, and capturing a plurality of calibration images by using the camera in correspondence to the prompt message, wherein the calibration data comprises a gaze range of each monitor watched;
calculating a current gaze direction according to a current image captured by the camera;
selecting a target monitor among the monitors according to the calibration data and the current gaze direction, wherein the gaze range of the target monitor watched comprises the current gaze direction; and
moving an object to a display area of the target monitor, wherein a new target monitor is selected according to another current gaze direction and a positional relationship between the monitors,
the new target monitor is selected when the another current gaze direction is greater than a predetermined angle value and the another current gaze direction approaches the new target monitor, wherein the positional relationship between the monitors comprises a horizontal arrangement and/or vertical arrangement, and the current gaze direction and the another current gaze direction comprise a yaw angle value and a pitch angle value.

2. The operation method for multi-monitor according to claim 1, wherein the step of acquiring the calibration data of the monitors comprises:
sending the prompt message for watching a plurality of corners of one of the monitors, and capturing the plurality of calibration images by using the camera in correspondence to the prompt message;
calculating a plurality of gaze directions corresponding to the corners according to the calibration images; and
calculating the gaze range of said one of the monitors watched according to the gaze directions.

3. The operation method for multi-monitor according to claim 1, wherein the current image comprises a head image, wherein the step of calculating the current gaze direction according to the current image captured by the camera comprises:
inputting the current image into a machine learning model to identify a plurality of feature points of the head image and calculate a head turning angle; and
determining the current gaze direction according to the head turning angle.

4. The operation method for multi-monitor according to claim 1, wherein the gaze ranges of the monitors watched do not overlap one another.

5. The operation method for multi-monitor according to claim 1, wherein the object comprises one of a cursor, a file, a folder and a window or a combination thereof.

6. An electronic system, comprising:
a plurality of monitors;
a storage device, configured to record calibration data of the monitors, wherein the calibration data comprises a gaze range of each monitor watched;
a camera, configured to capture a current image; and
a processor, coupled to the monitors, the storage device and the camera, and configured to:
send a prompt message to be appeared on one of the monitors, and acquire a plurality of calibration images by using the camera in correspondence to the prompt message;
calculate a current gaze direction according to the current image;
select a target monitor among the monitors according to the calibration data and the current gaze direction, wherein the gaze range of the target monitor watched comprises the current gaze direction; and
move an object to a display area of the target monitor, wherein a new target monitor is selected according to another current gaze direction and a positional relationship between the monitors,
the new target monitor is selected when the another current gaze direction is greater than a predetermined angle value and the another current gaze direction approaches the new target monitor, wherein the positional relationship between the monitors comprises a horizontal arrangement and/or vertical arrangement, and the current gaze direction and the another current gaze direction comprise a yaw angle value and a pitch angle value.

7. The electronic system according to claim 6, wherein the processor is further configured to acquire the calibration data, wherein when acquiring the calibration data, the processor is further configured to:
send the prompt message for watching a plurality of corners of one of the monitors, and acquire the plurality of calibration images by using the camera in correspondence to the prompt message;
calculate a plurality of gaze directions corresponding to the corners according to the calibration images; and
calculating the gaze range of said one of the monitors watched according to the gaze directions.

8. The electronic system according to claim 6, wherein the current image comprises a head image, wherein when calculating the current gaze direction according to the current image, the processor is further configured to:
input the current image into a machine learning model to identify a plurality of feature points of the head image and calculate a head turning angle; and
determine the current gaze direction according to the head turning angle.

9. The electronic system according to claim 6, wherein the object comprises one of a cursor, a file, a folder and a window or a combination thereof.

10. An operation method for multi-monitor applicable to an electronic system including a plurality of monitors and a plurality of cameras, wherein the monitors correspond to the cameras, and the operation method for multi-monitor comprises:
capturing a plurality of current images by using the cameras, respectively;
calculating a plurality of included angles between a current gaze direction and a lens direction of the cameras according to the current images;
selecting a target monitor among the monitors according to the included angles, wherein an included angle between the lens direction of the camera corresponding to the target monitor and the current gaze direction is a smallest included angle among the included angles; and
moving an object to a display area of the target monitor, wherein a new target monitor is selected according to a positional relationship between the monitors and another current gaze direction captured by a camera corresponding to the target monitor,
the new target monitor is selected when the another current gaze direction is greater than a predetermined angle value and the another current gaze direction approaches the new target monitor, wherein the positional relationship between the monitors comprises a horizontal arrangement and/or vertical arrangement, and the current gaze direction and the another current gaze direction comprise a yaw angle value and a pitch angle value.

* * * * *